United States Patent
Somschor et al.

(10) Patent No.: US 9,016,157 B2
(45) Date of Patent: Apr. 28, 2015

(54) GEAR MECHANISM HAVING HELICAL TOOTHING

(75) Inventors: Bernd Somschor, Tettnang (DE); Dieter Panowitz, Sigmarszell (DE); Milos Mahler, Grosshelfendorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 85 days.

(21) Appl. No.: 13/883,063

(22) PCT Filed: Nov. 7, 2011

(86) PCT No.: PCT/EP2011/069512
§ 371 (c)(1),
(2), (4) Date: May 2, 2013

(87) PCT Pub. No.: WO2012/072373
PCT Pub. Date: Jun. 7, 2012

(65) Prior Publication Data
US 2013/0239724 A1    Sep. 19, 2013

(30) Foreign Application Priority Data
Dec. 2, 2010 (DE) .......................... 10 2010 062 364

(51) Int. Cl.
*F16H 1/08* (2006.01)
*F16H 57/02* (2012.01)

(52) U.S. Cl.
CPC .............. *F16H 1/08* (2013.01); *Y10T 74/19679* (2015.01); *F16H 57/02004* (2013.01)

(58) Field of Classification Search
CPC ..... F16H 55/06; F16H 55/08; F16H 55/0806; F16H 55/17

USPC ............ 74/420, 421 A, 421 R, 434, 437, 444, 74/445, 457, 460, 462
See application file for complete search history.

(56) References Cited

U.S. PATENT DOCUMENTS

| 1,613,702 A * | 1/1927 | Hammar ......................... 74/462 |
| 1,766,153 A * | 6/1930 | Trbojevich ...................... 74/339 |

(Continued)

FOREIGN PATENT DOCUMENTS

| DE | 1 188 890 | 3/1965 |
| DE | 1 215 463 B | 4/1966 |

(Continued)

OTHER PUBLICATIONS

H. Langer, "Hydrodynamic Axial Force Transmission in Shafts of High-Speed Transmission", Konstuktion 34 (1982), vol. 12, pp. 473-478.

(Continued)

*Primary Examiner* — William Kelleher
*Assistant Examiner* — Terence Boes
(74) *Attorney, Agent, or Firm* — Davis & Bujold, PLLC; Michael J. Bujold

(57) ABSTRACT

A gear train with at least first and second spur gears (1, 2) which have a tooth width (b), mesh with one another and each have helical teeth (3, 4). The first spur gear (1) has a tooth profile with a crown circle diameter and the second spur gear (2) has a tooth profile with a root circle diameter. The first spur gear (1) has at least one projection (5) on the tooth profile that extends partially along the tooth width and beyond the crown circle diameter, and the at least one projection (5) has at least one contact face (5a) in the axial direction.

7 Claims, 1 Drawing Sheet

(56) References Cited

U.S. PATENT DOCUMENTS

| | | | | |
|---|---|---|---|---|
| 2,335,504 A | * | 11/1943 | Gazda | 74/462 |
| 3,206,993 A | | 9/1965 | Niemann | |
| 4,127,041 A | * | 11/1978 | Imazaike | 74/411 |
| 5,946,975 A | * | 9/1999 | Yun | 74/462 |
| 6,230,578 B1 | * | 5/2001 | Kim et al. | 74/462 |
| 6,837,123 B2 | * | 1/2005 | Hawkins | 74/457 |
| 7,296,489 B2 | * | 11/2007 | Oomura et al. | 74/7 E |
| 7,406,892 B2 | * | 8/2008 | Takeuchi et al. | 74/440 |
| 2007/0283776 A1 | * | 12/2007 | Fujimaru | 74/434 |
| 2012/0132024 A1 | * | 5/2012 | Mittermair et al. | 74/421 R |
| 2013/0239724 A1 | * | 9/2013 | Somschor et al. | 74/421 R |

FOREIGN PATENT DOCUMENTS

| | | |
|---|---|---|
| DE | 2 114 644 | 10/1971 |
| DE | 30 22 020 C2 | 9/1982 |
| DE | 196 32 103 A1 | 2/1997 |
| EP | 0 083 922 A1 | 7/1983 |
| GB | 1 348 994 | 3/1974 |
| GB | 2 078 332 A | 1/1982 |

OTHER PUBLICATIONS

German Search Corresponding to 10 2010 062 364.4 mailed Jun. 3, 2011.

International Search Corresponding to PCT/EP2011/069512 mailed Feb. 13, 2012.

Written Opinion Corresponding to PCT/EP2011/069512 mailed Feb. 13, 2012.

Russian Search Report issued in corresponding Russian Application No. 2013129954/11 mailed May 28, 2014.

* cited by examiner

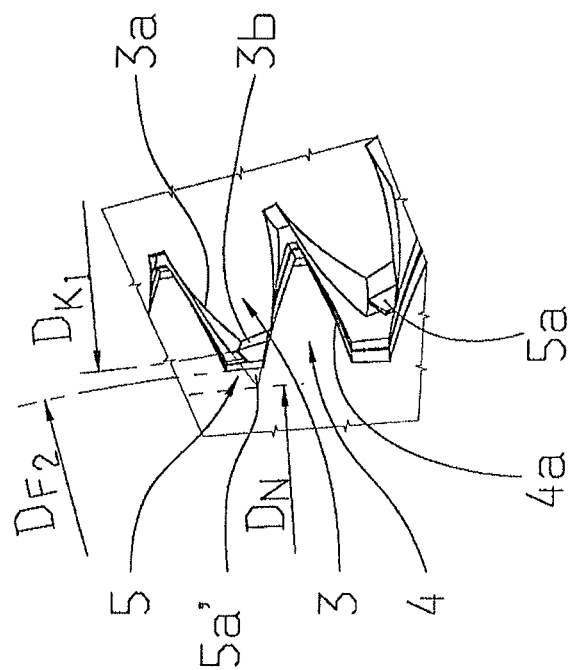
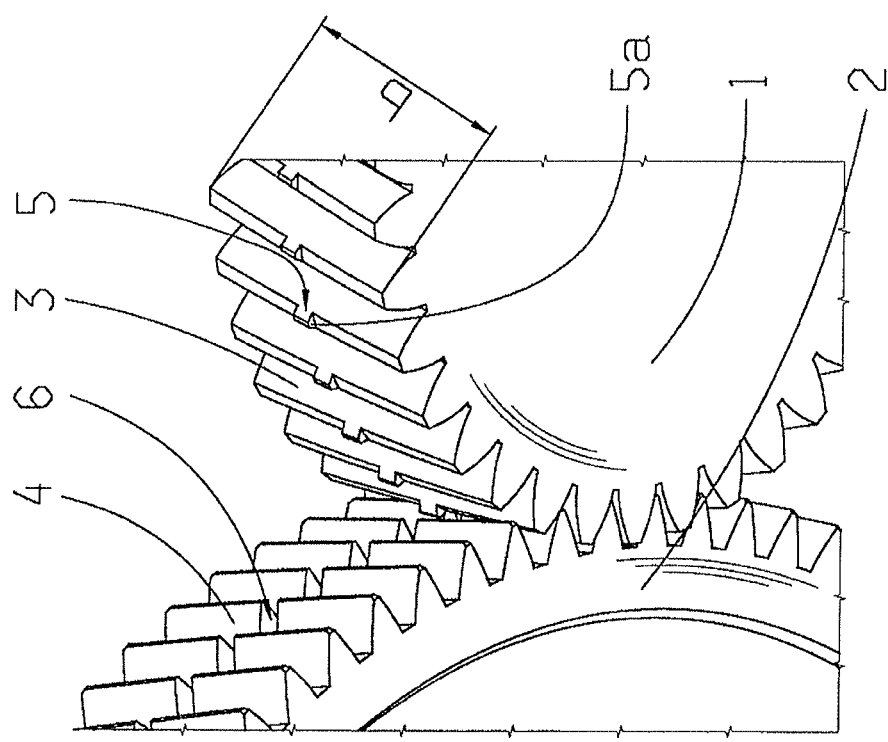
Fig. 1a
Fig. 1

GEAR MECHANISM HAVING HELICAL TOOTHING

This application is a National Stage completion of PCT/EP2011/069512 filed Nov. 7, 2011, which claims priority from German patent application serial no. 10 2010 062 364.4 filed Dec. 2, 2010.

FIELD OF THE INVENTION

The invention concerns a gear train comprising at least two spur gears that mesh with one another and which have helical teeth.

BACKGROUND OF THE INVENTION

In spur gear stages with helical teeth, axial forces are produced which have to be absorbed by appropriately sized axial bearings. For this, conical-roller bearings are often used, which on the one hand are relatively expensive and on the other hand generate a relatively high heat output. It has therefore already been proposed, instead of costly axial bearings, to arrange so-termed pressure pads on spur gears having helical teeth, whereby the axial forces are absorbed. In the technical paper *"Hydrodynamic axial force transmission in shafts of high-speed transmissions"* by H. Langer, published in the journal *Konstuktion* 34 (1982), Vol. 12, pp. 473-478, such pressure pads are described. The known pressure pad is made as a separate, annular individual component (pressure ring) and is joined to the spur gear concerned, the spur gear and the pressure ring generally being connected to one another by a shrink fit. The pressure ring, which is attached in the middle or at the front end of the spur gear, preferably has conical faces which come into contact with corresponding contact faces of the mating gear, for example the groove flanks of a ring groove in the mating gear. Between the contact faces a lubricant film is formed. A disadvantage of the known pressure rings or pressure pads made as add-on components is that their attachment to the spur gear is not always reliable. Owing to the action of centrifugal force during operation, the shrink fit seating can become loose or fall apart.

From DE 1 215 463 a gear train with a helically toothed pinion is known, onto the middle of which a ring with conical contact surfaces is shrunk. The conical contact surfaces run against groove flanks of a ring groove positioned centrally in the two mating gears that mesh with the pinion. The ring, which can also be called a pressure pad, absorbs the axial forces resulting from the helical teeth so that corresponding axial bearings can be omitted.

SUMMARY OF THE INVENTION

The purpose of the present invention is to design a gear train of the type mentioned to begin with, in such manner that axial forces resulting from the helical teeth can be reliably and lastingly absorbed so far as possible without axial bearings.

According to the invention, in the first spur gear at least one projection of the tooth profile beyond the crown circle is provided, this projection extending partially along one or more parts of the tooth width. Due to the projection on the tooth profile, i.e. on the teeth, a tapered tooth profile is produced, which in the area of the projection has at least one lateral contact face. By virtue of the projection on the tooth profile, the axial forces that result from the helical teeth can be absorbed since the at least one contact face on the first spur gear comes in contact in the axial direction with a corresponding contact face on the second spur gear. A pairing of contact faces on the first and second spur gears results in support in one axial direction, while two pairings of contact faces on the first and second spur gears results in support in both axial directions. The projection on the tooth profile leads to an overlap of the two spur gears in the axial direction. Thanks to this, expensive axial bearings such as conical-roller bearings can be omitted, which considerably reduces the manufacturing costs of such a gear train. In contrast to the prior art mentioned earlier, the projections are formed on each individual tooth profile, i.e. on the tooth crowns, integrally with the teeth or spur gear or gear ring. First a tooth array with projections extending along the full width of the teeth is produced, and then the material projecting above the crown circle is partially removed by machining, for example by turning on a lathe, so that partial projections remain. The advantage of this integral design form is that to absorb the axial forces there is no need for an additional component in the form of an additional annular pressure pad, which could loosen or come off under operational loading. Accordingly, the solution according to the invention is more reliable and durable.

In a preferred embodiment the at least one projection is positioned within the tooth width. For example, a projection can be positioned in the middle of the tooth width or a plurality of projections can be provided along the area of the tooth width. Each projection is associated with a ring groove in the second spur gear in which the projection engages in the tooth profile and so forms an overlap in the axial direction. With its groove flanks the ring groove forms the contact faces that match the contact faces on the projections.

In a further preferred embodiment projections are only provided at the end faces of the first spur gear, which then embrace the second spur gear. No ring groove is then needed in the second spur gear, but only laterally positioned contact faces which, with the contact faces on the projections, form two pairs that absorb the axial forces in both directions. The contact faces can be of flat, conical or cambered shape. As is known from the prior art mentioned at the beginning, a lubricant film forms between the contact faces of the first and second spur gears.

BRIEF DESCRIPTION OF THE DRAWINGS

An example embodiment of the invention is illustrated in the drawings and will be described in more detail below. The drawings show:

FIG. 1: A section of a spur gear stage according to the invention, shown in perspective, and FIG. 1a: An enlarged section showing the tooth engagement of the two spur gears.

DETAILED DESCRIPTION OF THE PREFERRED EMBODIMENTS

FIG. 1 shows a first gearwheel 1 and a second gearwheel 2, each with helical teeth 3, 4. The two gearwheels, also called spur gears 1, 2, mesh with one another and axial forces are produced because of the helical teeth. The two spur gears 1, 2 have approximately equal tooth widths b. On the first spur gear 1 the helical tooth array 3, also referred to for brevity as just teeth 3 in what follows, have projections in the central area of the tooth width b which form prismatic bodies 5 arranged on the tooth crowns like roof-shaped ridges or serrations. The prismatic bodies 5, in general also referred to as projections 5, have contact faces 5a on each side which are shown enlarged in FIG. 1a. In the drawing, in each case only the front contact faces 5a can be seen. Corresponding to the projections 5 on the first spur gear 1, an all-round groove 6, also called a ring groove 6, is formed in the second spur gear 2, in which groove the projections 5 engage.

FIG. 1*a* shows the engagement of the two spur tooth configurations 3, 4 of the first and second spur gears 1, 2 as viewed in the axial direction. A tooth of the helical tooth array 3 has a tooth profile 3*a* with a tooth crown 3*b* and a crown circle diameter $D_{K1}$. The teeth 4 of the second spur gear 2 have a tooth profile 4*a* with a root circle diameter $D_{F2}$. The ring groove 6 formed in the second spur gear 2 extends in the radial direction inward beyond the root circle diameter $D_{F2}$, and has a groove bottom diameter $D_N$ such that $D_N < D_{F2}$. On the tooth crown 3*b* of the first spur gear 1 is positioned the projection in the form of the prismatic body 5, which in FIG. 1*a* has the approximate shape of an equilateral triangle. In the area of the ring groove 6, by virtue of the prominence of the prismatic body 5 beyond the root circle diameter $D_{F2}$ there is an overlap 5*a*' in the axial direction, by virtue of which the axial forces are transferred. The prismatic bodies 5 on the tooth crowns 3*b* are formed integrally with the spur teeth 3 and the latter can be made integrally with the first spur gear 1 or as a tooth ring. Thus, preferably the spur teeth are made first with a provisional crown circle diameter which is larger than the crown circle diameter $D_{K2}$ of the finished helical teeth 3. Then, the material on both sides of the peaks 5 is removed by machining, for example turning on a lathe. The projections 5 then remain, as shown in FIG. 1.

The embodiment illustrated in FIGS. 1 and 1*a* is one of many possible solutions according to the invention. For example, it is possible—but not illustrated here—for a plurality of projections or prismatic bodies to be provided in the direction of the tooth width b, which engage in corresponding ring grooves formed in the second spur gear. In this way a larger overlap area for transferring the axial forces can be provided. However, it is also possible to position the projections at the front end on the first spur gear 1, so that the projections each have only one, inward-facing contact surface and engage the second spur gear from outside. This provides a force flow within the spur gear stage which is closed in relation to the axial forces that occur.

Indexes

1 First spur gear
2 Second spur ge
3 Helical teeth
3*a* Tooth profile
3*b* Tooth crown
4 Helical teeth
4*a* Tooth profile
5 Projection (prismatic body)
5*a* Contact surface
5*a*' Overlap
6 Ring groove
b Tooth width
$D_{K1}$ Crown circle diameter, gear 1
$D_{F2}$ Root circle diameter, gear 2
$D_N$ Groove bottom diameter, gear 2

The invention claimed is:

1. A gear train comprising:
at least first and second spur gears (1, 2) each having helical teeth (3, 4) meshing with one another, and each of the at least first and second spur gears (1, 2) having a tooth width (b),
the first spur gear (1) having a tooth profile (3*a*) with a crown circle diameter ($D_{K1}$),
the second spur gear (2) having a tooth profile (4*a*) with a root circle diameter ($D_{F2}$), and
the first spur gear (1) having at least one projection (5) on the tooth profile (3*a*) extending partially along the tooth width beyond the crown circle diameter ($D_{K1}$), and the at least one projection (5) having, in an axial direction, at least one contact face; wherein the at least one projection (5) mates with a corresponding ring groove (6) formed in the second spur gear (2), and the ring groove (6) has a groove bottom diameter (DN) which is smaller than the root circle diameter (DF2) to facilitate receiving the at least one projection (5) of the first spur gear (1) (5*a*).

2. The gear train according to claim 1, wherein the at least one projection (5) is positioned along the tooth width (b) of at least one tooth profile (3*a*) of the first spur gear (1), and the ring groove (6) has groove flanks which form contact faces.

3. The gear train according to claim 1, wherein the at least one projection (5), on the first spur gear (1), is arranged at an end and embraces the second spur gear (2).

4. The gear train according to claim 1, wherein the at least one projection (5) is in a form of a prismatic body (5).

5. The gear train according to claim 1, wherein the at least one projection (5) is formed integral with the helical teeth (3).

6. The gear train according to claim 1, wherein interaction of the contact faces (5*a*), of the projections (5), with the groove flanks of the ring groove (6), of the second spur gear (2), absorb axial forces in both directions.

7. A gear train comprising:
at least first and second spur gears (1, 2) each having helical teeth (3, 4) meshing with one another, and each of the at least first and second spur gears (1, 2) having a tooth width (b);
the first spur gear (1) having a tooth profile (3*a*) with a crown circle diameter (DK1);
the second spur gear (2) having a tooth profile (4*a*) with a root circle diameter (DF2);
the first spur gear (1) having at least one projection (5) on the tooth profile (3*a*) extending partially along the tooth width beyond the crown circle diameter (DK1), and the at least one projection (5) having, in an axial direction, at least one contact face (5*a*); and the at least one projection (5) is positioned along the tooth width (b) of at least one tooth profile (3*a*) of the first spur gear (1) and the at least one projection (5) mates with a corresponding ring groove (6) formed in the second spur gear (2), and the ring groove (6) has groove flanks which form contact faces; wherein the at least one projection (5) and the corresponding ring groove (6) are both arranged approximately in a central portion of the tooth width (b) and the at least one projection (5) has contact surfaces (5*a*) on both sides thereof which mate with groove flanks of the ring groove (6).

* * * * *